…

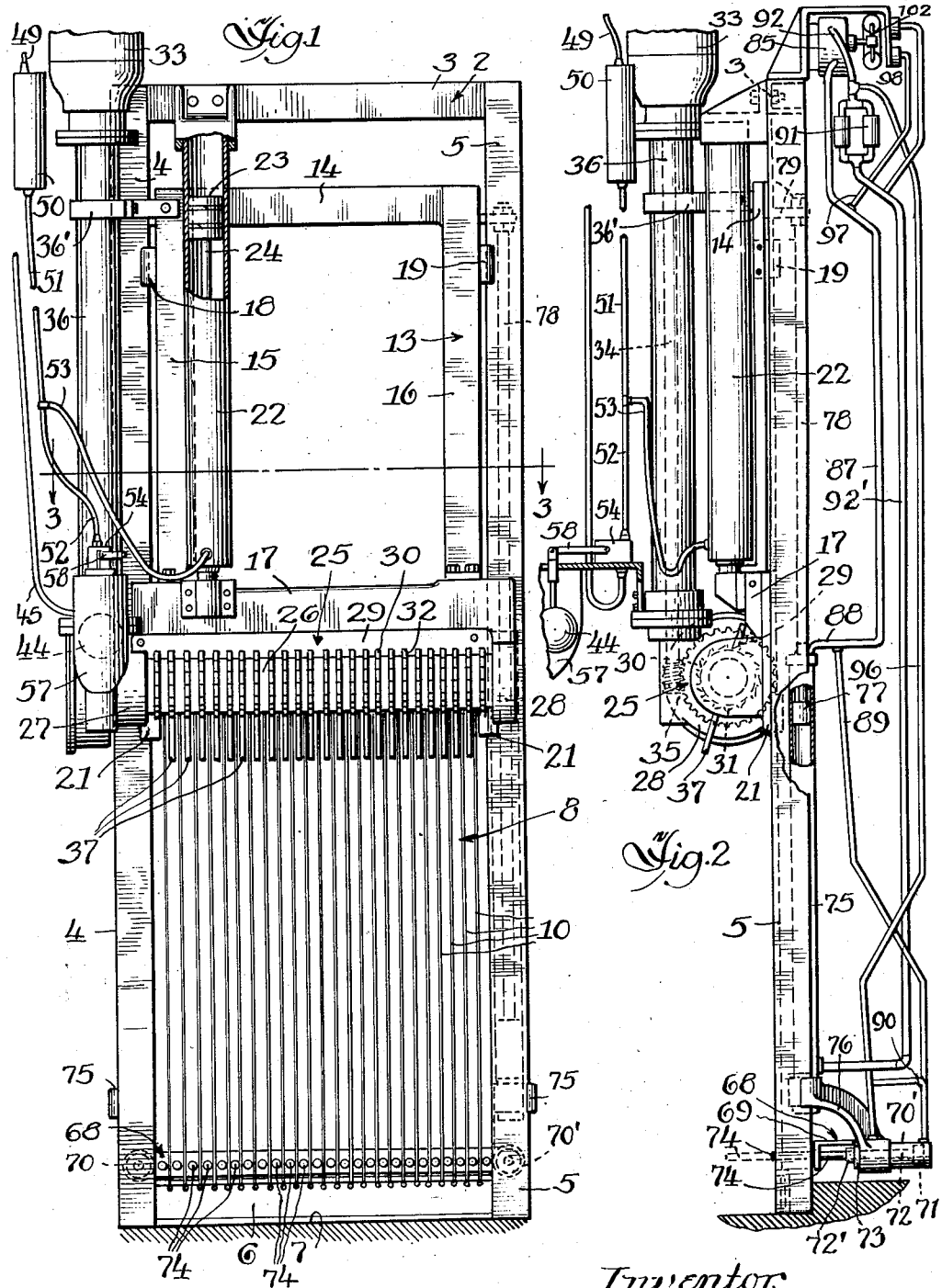

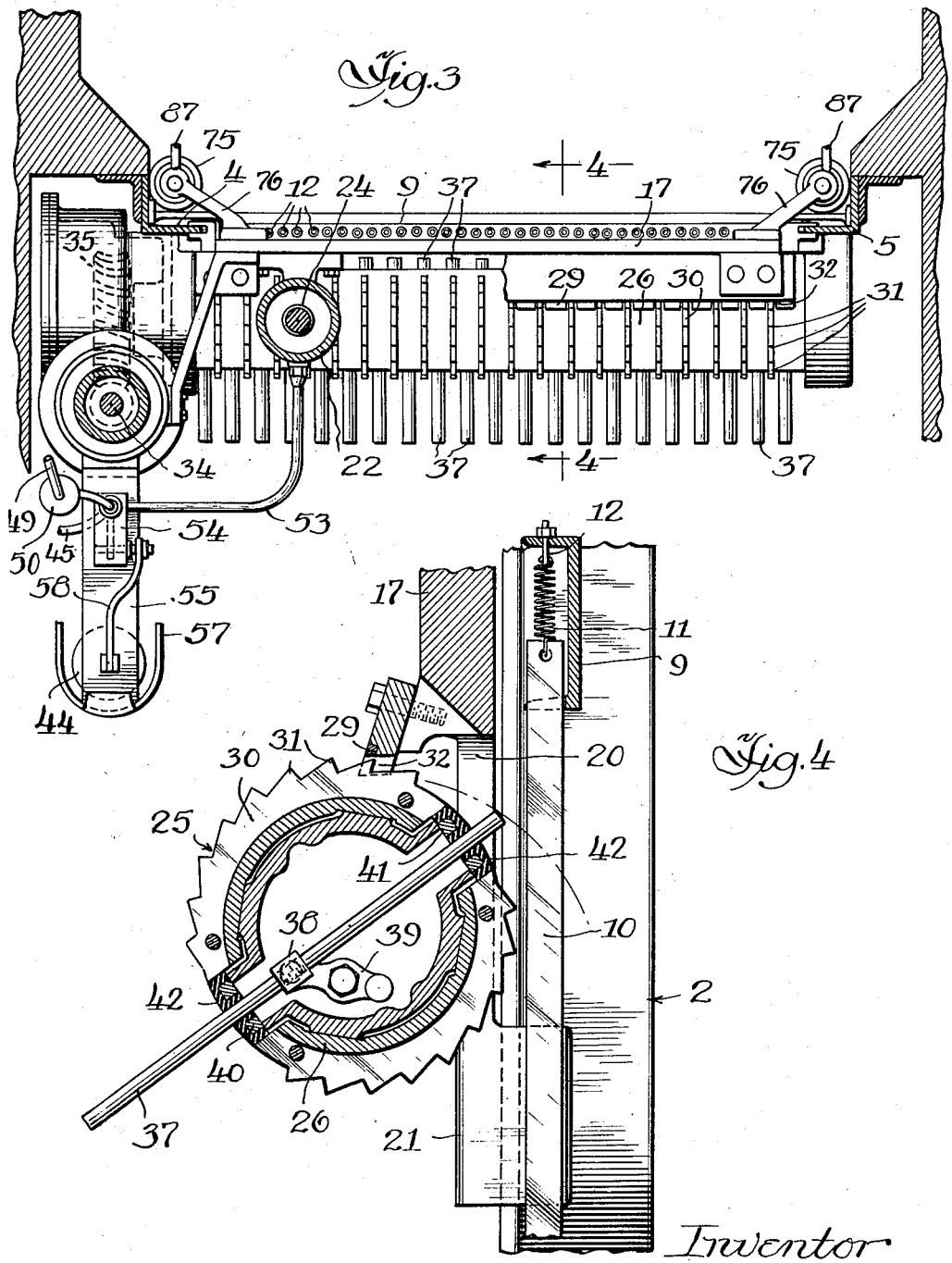

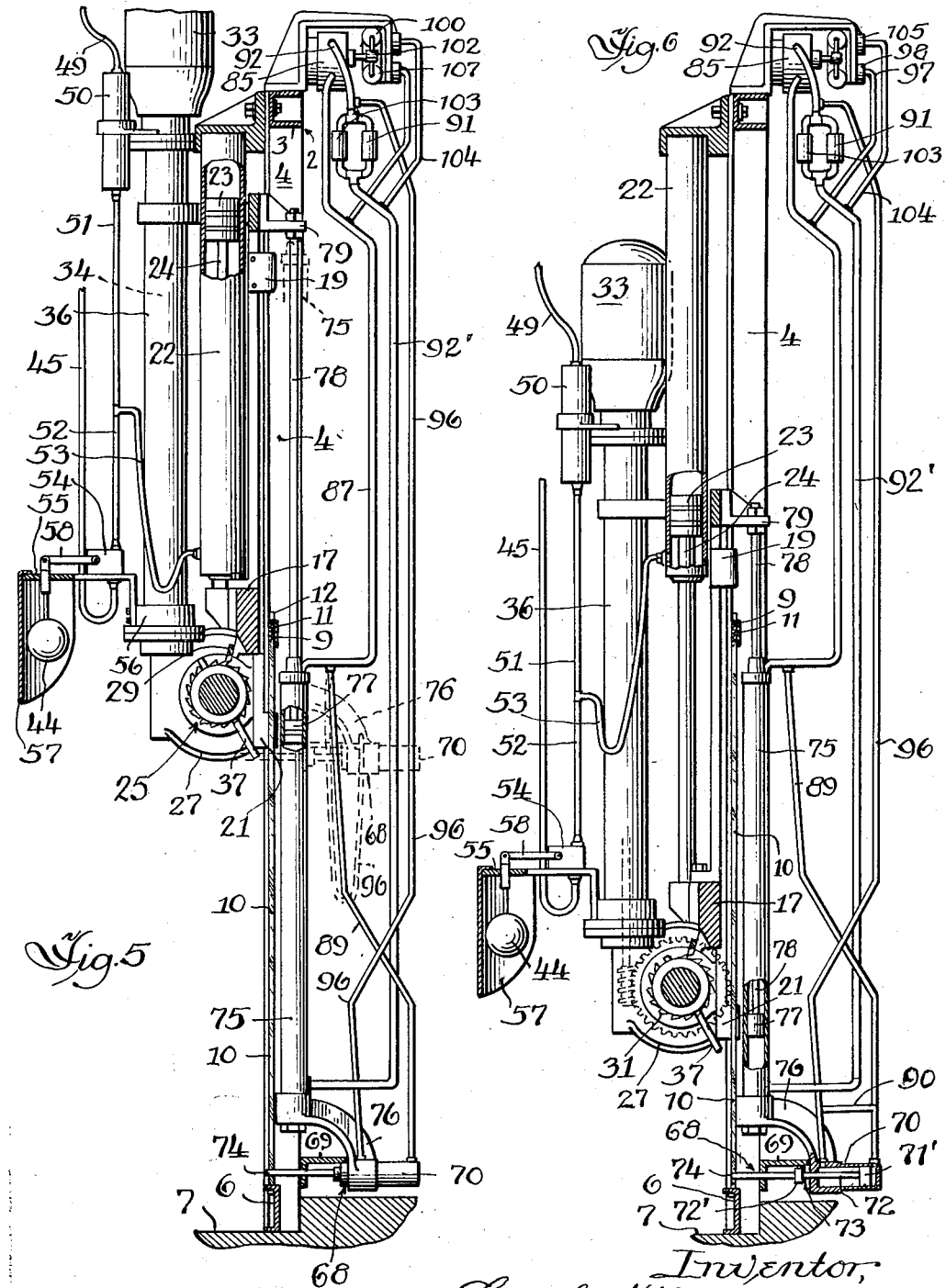

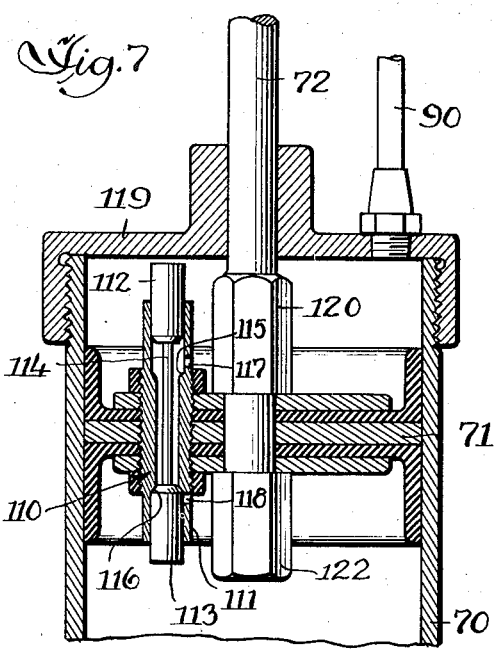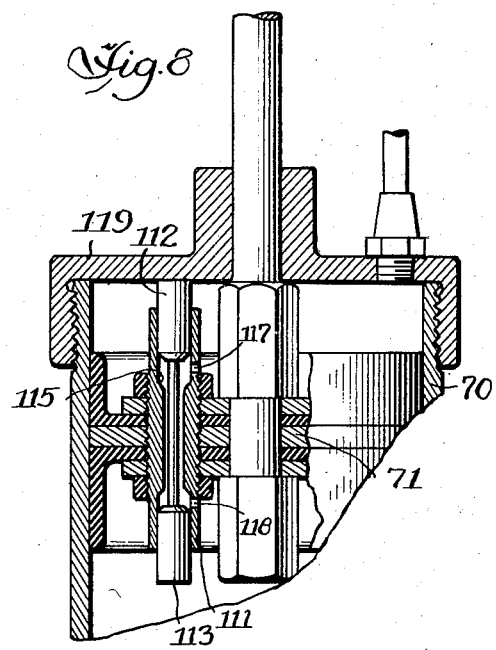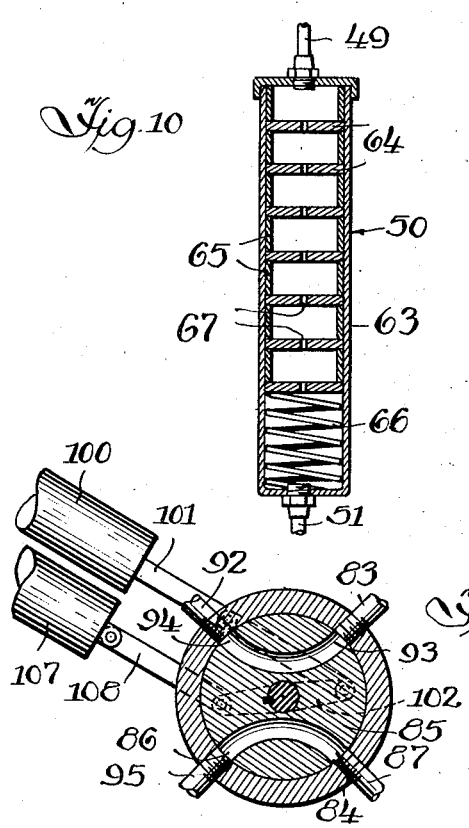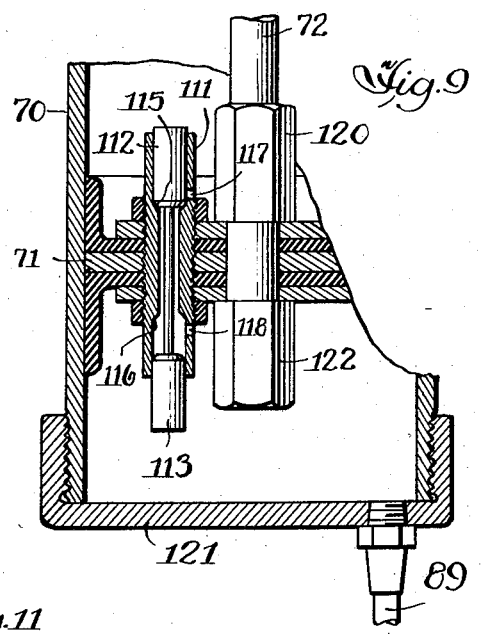

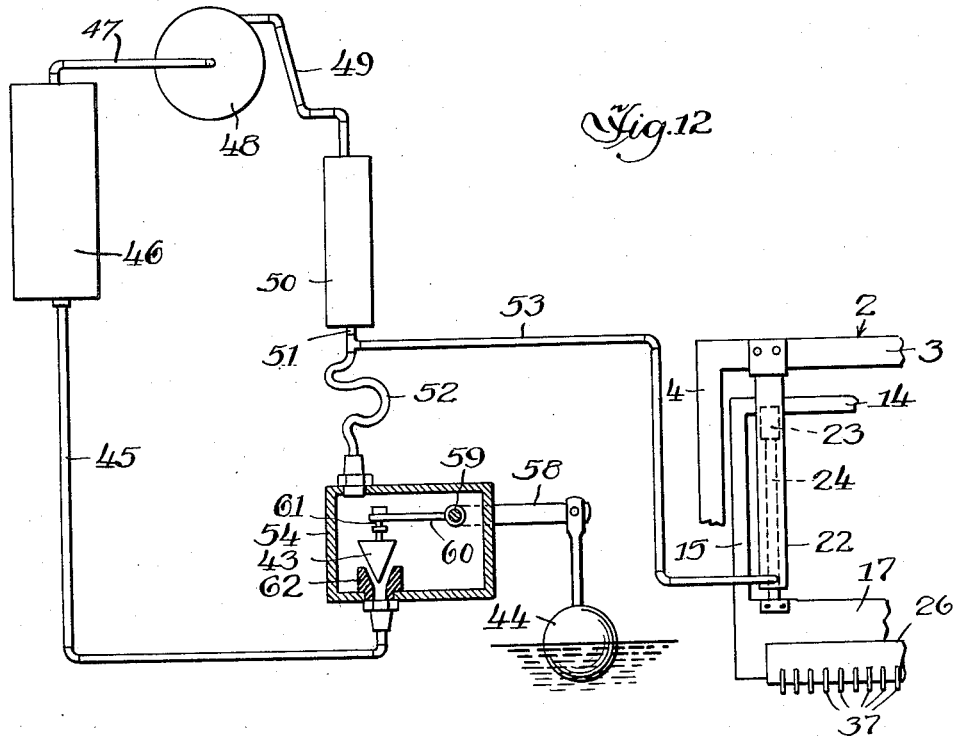
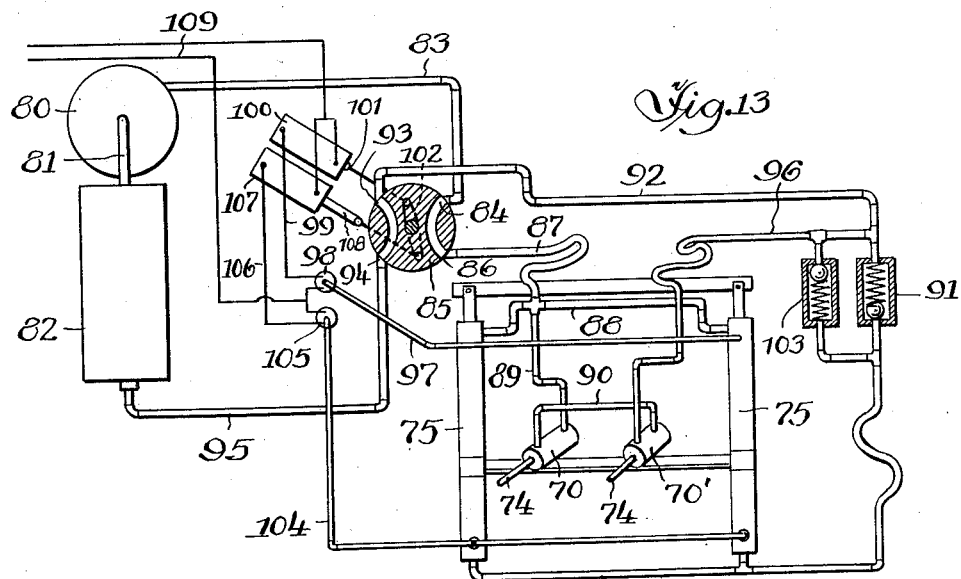

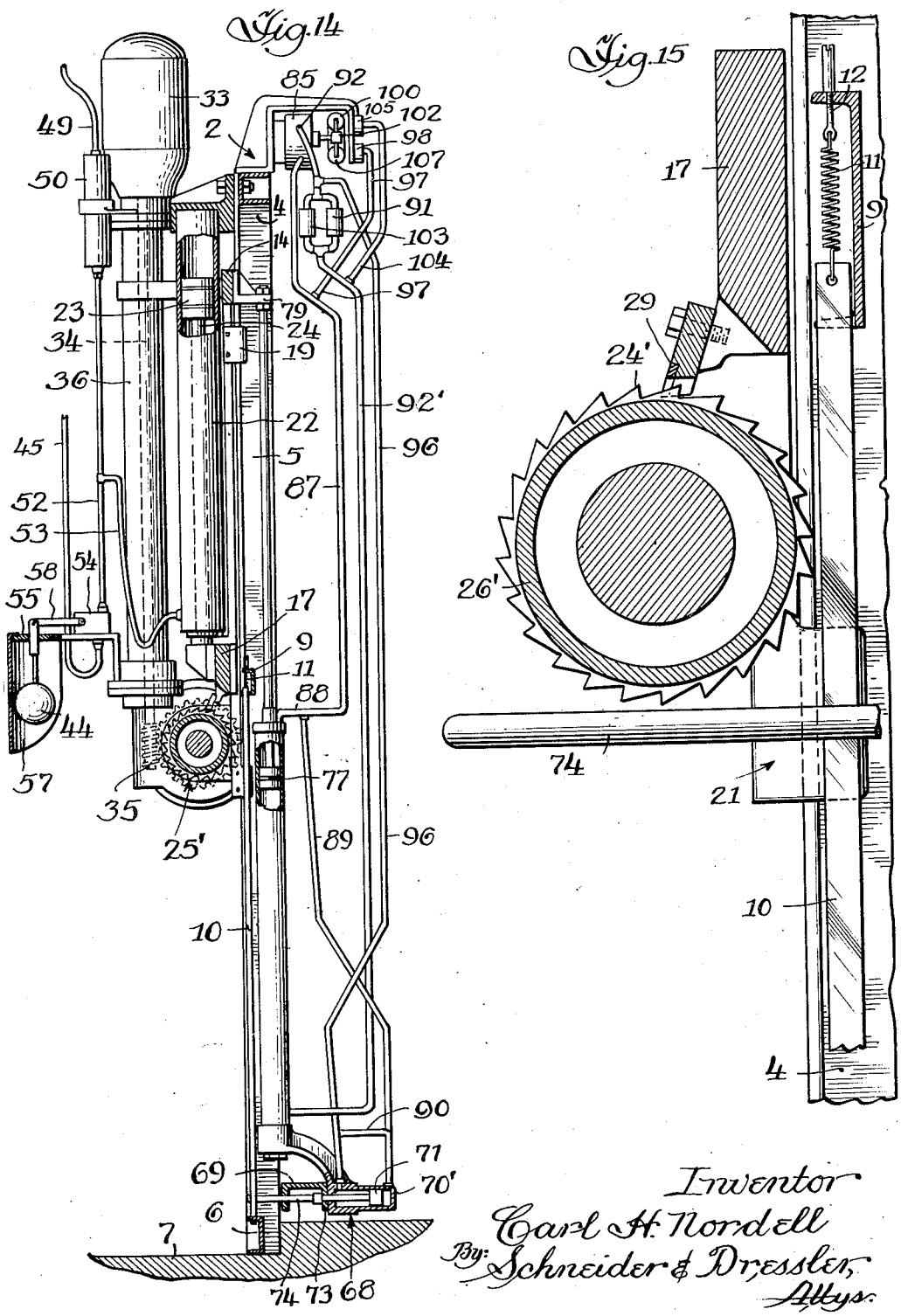

United States Patent Office 2,866,555
Patented Dec. 30, 1958

2,866,555

CYLINDER LEVEL CONTROL FOR COMMINUTING DEVICES AND METHOD FOR COMMINUTING

Carl H. Nordell, Crystal Bay, Nev.

Application February 14, 1955, Serial No. 488,054

24 Claims. (Cl. 210—67)

This invention relates to a cylinder level control for comminuting units, and is particularly concerned with automatic means for adjusting the position of a comminuting unit in a flowing stream of sewage having a fluctuating liquid level so that the unit is always just slightly submerged and moves up and down automatically with the rise and fall of the liquid level to provide wet comminution just below the surface of the sewage.

The level control mechanism is designed for use with comminuting units positioned adjacent a vertically disposed screen but may also be used with angularly disposed screens. The screen may be of any suitable type. One example of such a screen comprising a plurality of flexible, flat metal ribbons disposed edgewise to the stream of sewage and held under tension is disclosed in my Patent No. 2,727,627, issued December 20, 1955. Another example of a suitable screen is disclosed in my copending application Serial No. 417,838, filed March 22, 1954.

The screen extends from the bed of the sewage channel to a level above the maximum level of the sewage, and is mounted in a rectangular frame. An inner frame is mounted for vertical movement in the first mentioned frame, and the comminuting unit is mounted on the inner frame so as to move therewith. Any suitable type of comminuting unit may be used. Specific examples of suitable comminuting units are disclosed in my Patents Nos. 2,672,985, issued March 23, 1954, and 2,750,044, issued June 12, 1956, and the copending applications of Milton Spiegel, Serial No. 426,096, filed April 28, 1954, and Edwin D. Simmons, Serial No. 430,908, filed May 19, 1954.

The inner frame also carries a float valve assembly which actuates means for raising and lowering the inner frame in synchronism with the rise and fall of the liquid level of the sewage stream. The cutting cylinder operates most efficiently when it is submerged slightly below the liquid level, and the float valve mechanism maintains it in such position. The mechanism for raising and lowering the comminuting unit is preferably operated by a hydraulic system, but may be operated electrically, or even mechanically.

The comminuting unit may be provided with a helper rake for moving the sewage solids along the screen to the proximity of the cutting cylinder, or to the proximity of the tines, if the cutting cylinder is provided with transfer tines, to lift the solids from the screen and transfer them to the cutting cylinder. The cylinder level control may also be used with comminuting units that are not provided with a helper rake. If a helper rake is provided, a stop member is mounted on the inner frame to limit the upward movement of the helper rake to insure termination of its upward movement in the same predetermined relationship to the cutting cylinder, or to the tines, if tines are provided, regardless of the level at which the cutting cylinder may be positioned.

The position of the comminuting unit is regulated by a lifting cylinder actuated by a valve in a hydraulic system controlled by a float. This valve is partially open when the float is level. The oil pressure is constant in the line and oil is by-passed from the pump through the valve to maintain a constant pressure on the lifting cylinder, thus holding the comminuting unit in its adjusted position.

If the liquid level of the sewage stream rises, the float restricts or closes the valve to reduce the amount of oil by-passed through the valve or to cut it off completely. This forces oil from the pump into the lifting cylinder, and causes the comminuting unit to move vertically upwardly in the sewage stream. The valve housing is mounted on the inner frame, and it moves with the comminuting unit. When the float reaches the level position the valve is automatically opened to its initial position and the oil is again by-passed through the valve instead of flowing to the lifting cylinder. The pressure on the lifting cylinder is maintained as before, and the comminuting unit is held in the newly adjusted position.

If the liquid level drops, the valve opening is increased and oil flows from the lifting cylinder through the valve along with the oil from the pump that is normally by-passed through the valve. The resulting decrease in the volume of oil in the lifting cylinder causes the comminuting unit to move downwardly until the float reaches its level position at which the weight of the comminuting unit is balanced by the oil pressure, and the valve is moved to its normal partially open position in which the pressure on the lifting cylinder is just enough to maintain the comminuting unit in the newly adjusted position.

When a helper rake is included as part of the apparatus each end of the rake is secured to a support cylinder, and movement of the support cylinders is effective to reciprocate the rake vertically of the screen. The support cylinders each have a piston rod secured at one end to the stationary framework of the apparatus, and corresponding ends of the cylinders are interconnected so that oil flows directly into the corresponding ends of both cylinders to move both cylinders simultaneously equal distances in the same direction. Similarly, when the flow is reversed, the same action takes place in the opposite direction, and both ends of the rake are moved equally, with the rake always parallel to its initial position throughout its entire movement.

The hydraulic circuit for reciprocating the helper rake includes a four-way valve which is actuated by increase of pressure in the support cylinders. When the support cylinders are arrested at either end of their stroke there is an increase of pressure. A pair of switches selectively actuated by the increase of pressure energizes one of two solenoids to rotate the four-way valve and reverse the motion of the cylinders.

Each end of the rake is secured to one of the support cylinders by a bracket which also supports a horizontally mounted cylinder. The pistons of the horizontally mounted cylinders reciprocate the helper rake horizontally in synchronization with the vertical reciprocation of the helper rake. The horizontally reciprocating pistons are actuated by lines interconnected with the hydraulic circuit controlling the vertical reciprocation of the helper rake in such a manner that the rake fingers are retracted while the rake is moving downwardly, to prevent the rake from moving solid matter intercepted by the screen away from the cutting cylinder, and are projected while the rake is moving upwardly, to enable the rake to move such solids upwardly towards the cutting cylinder.

The front end of one horizontal cylinder is connected to the back end of the other by a hose so that oil forced out of the front end of one cylinder by forward movement of its piston flows directly into the back end of the other, and oil forced out of the back end of the second cylinder by rearward movement of its piston flows directly into the front end of the first cylinder. The interconnection between the front end of one cylinder and the rear end of the other insures simultaneous and equal movement of both horizontal pistons. Accordingly, both ends of the rake are reciprocated simultaneously in the horizontal direction and the rake fingers are projected and retracted in unison.

A leveling valve is provided in the piston of one of the horizontal cylinders to take care of any possible leakage in the hydraulic circuit. If any leakage occurs in the pistons or stuffing-box glands the volume of oil trapped between the pistons would normally increase or diminish, and thereby destroy the even motion of the rake. The leveling valve automatically injects additional oil between the pistons and thus maintains a substantially uniform volume of fluid between the pistons regardless of leakage.

The structure by which the above-mentioned and other advantages of the invention are attained will be described in the following specification, taken in conjunction with the accompanying drawings, showing a preferred illustrative embodiment of the invention, in which:

Figure 1 is a front elevational view of an apparatus embodying the invention, with the cutting cylinder in the position occupied when the liquid level is at a high point;

Fig. 2 is a side elevational view of the apparatus shown in Fig. 1;

Fig. 3 is a cross sectional view, taken generally along the line 3—3 of Fig. 1, with parts broken away to facilitate illustration of the structure;

Fig. 4 is a fragmentary cross sectional view, taken along the line 4—4 of Fig. 3;

Fig. 5 is a side view, similar to Fig. 2, partly in section, and partly in elevation, showing the position of the helper rake at the top of its travel in dotted lines;

Fig. 6 is a vertical cross sectional view, similar to Fig. 5, but showing the position of the cutting cylinder when the liquid level is relatively low, the helper rake being shown in the position it occupies at the bottom of its travel;

Fig. 7 is a fragmentary cross sectional view of the front end of one horizontal cylinder, showing the position of the leveling valve just before the piston reaches the end of its stroke;

Fig. 8 is a view, similar to Fig. 7, showing the position of the leveling valve at the end of the stroke of the piston;

Fig. 9 is a fragmentary cross sectional view of the back end of the horizontal cylinder, showing the position of the leveling valve as the piston is moving upwardly.

Fig. 10 is a longitudinal sectional view through the flow resistor for regulating the flow of oil pumped from the reservoir;

Fig. 11 is a fragmentary cross sectional view through the pressure switched, four-way valve for controlling the direction of movement of the support cylinders which reciprocate the helper rake;

Fig. 12 is a diagrammatic view of the hydraulic circuit for adjusting the elevation of the comminuting unit to the liquid level of the sewage;

Fig. 13 is a diagrammatic view of the hydraulic circuit for reciprocating the helper rake;

Fig. 14 is a view similar to Fig. 2, showing an embodiment of the apparatus in which the cutting cylinder is not provided with tines; and Fig. 15 is an enlarged fragmentary cross sectional view of the embodiment of Fig. 14, with the helper rake in its uppermost position.

Referring to the drawings, the reference numeral 2 indicates a framework comprising a transverse top channel iron 3, a pair of vertical angle irons 4 and 5, and a bottom channel iron 6. The framework is rigidly secured in any suitable manner within an influent channel 7 through which flows unscreened sewage containing solids. Although the framework is illustrated as extending perpendicularly to bottom of channel 7, it will be understood that it may slope upwardly and rearwardly at any desired angle.

A screen 8, mounted in the lower portion of framework 2 extends from the upper edge of bottom channel iron 6 upwardly to a transverse angle iron 9 secured to the framework at a level above the maximum height of the liquid level of the sewage stream. The screen illustrated comprises a plurality of flexible, flat metallic ribbons 10 disposed edgewise and spaced uniformly transversely of channel 7. Each ribbon is held under tension by a coiled spring 11 (Fig. 4) secured at one end to the upper end of the ribbon and at its other end to an eyebolt 12 mounted in angle iron 9.

An inner frame 13 is slidably mounted within framework 2. The inner frame comprises a top transverse member 14, vertical members 15 and 16, and a bottom transverse member 17. Each of the vertical members has a guide bracket 18, 19, respectively, rigidly secured thereto and fitting over vertical frame members 4 and 5. Bottom frame member 17 is provided with a depending bracket 20 having flanges 21 fitting over vertical frame members 4 and 5 to cooperate with guide brackets 18 and 19 to insure vertical movement of inner frame 13. A lifting cylinder 22, secured at its upper end to top channel iron 3, is provided with a piston 23 actuated in a manner hereinafter described to reciprocate a piston rod 24 secured at its lower end to upper transverse member 17 of inner frame 13.

A comminuting unit 25 is mounted on transverse frame member 17 for vertical reciprocation therewith. The comminuting unit comprises a cutting cylinder 26, rotatably mounted in housings 27 and 28 carried by bracket 20, and a comb 29 rigidly secured to frame member 17. The cutting cylinder is provided with a plurality of transversely spaced laterally extending disks 30 each having its outer circumference serrated to provide teeth 31 adapted to pass between adjacent screen ribbons 10 and into notches 32 of comb 29 as the cutting cylinder is rotated. The cutting cylinder is rotated by a motor 33 through a shaft 34 and suitable reduction gearing 35. Shaft 34 is encased in a sleeve 36 extending from the motor housing to housing 27 in which gearing 35 is encased. A collar 36' encircling sleeve 36 is secured to top transverse frame member 14 to cooperate with guide brackets 18 and 19, to keep inner frame 13 from wobbling in its vertical movement.

In the embodiment of Figs. 1 to 13 cutting cylinder 26 is provided with two series of tines 37 mounted on a bar 38 carried by a pair of crank arms 39 eccentrically mounted within the cutting cylinder so as to reciprocate the bar axially of the tines as the cutting cylinder is rotated. The tines are alternately arranged so that half of them extend from bar 38 in one direction, and the other half extend in the opposite direction. The tines extend through individual apertures provided therefor in a pair of plates 40 and 41 secured in the peripheral surface of cylinder 26 in diametrically opposite positions. A layer 42 of rubber or similar material is bonded to each plate 40 and 41 to provide a seal through which the tines may slide.

As cutting cylinder 26 is rotated in the sewage stream, transfer tines 37 move with the cylinder because of their engagement with plates 40 and 41. At the same time bar 38 moves the tines axially so that the tines projecting through plate 40 are retracted within cylinder 26 when plate 40 is adjacent comb 29, and the tines projecting through plate 41 are retracted within cylinder 26 when plate 41 is adjacent comb 29. Each series of tines is fully extended when the other is retracted.

The fully extended tines pass between adjacent screen ribbons 10 as cutting cylinder 26 is rotated, picking up solid matter intercepted by the screen from the sewage stream and carrying it from the surface of the screen towards comb 29. As the tines approach the comb they are gradually retracted and the solid matter is wiped from their surface by the seal 42. The solid matter is then engaged by either teeth 31 or the peripheral surface of cylinder 26 and is carried into engagement with comb 29. The solid matter is comminuted by the interaction of cylinder 26 and comb 29 while the tines are completely retracted within the cylinder.

It has been found that comminution of the solid matter intercepted by a screen positioned in a stream of flowing sewage is most efficient when the cutting cylinder is slightly submerged below the liquid level of the sewage stream. Accordingly, I have provided means for automatically reciprocating the comminuting unit in response to the rise and fall of the liquid level and means for maintaining the cutting cylinder submerged slightly below the liquid level at all times.

As shown best in Figs. 5, 6, and 12, the hydraulic system for controlling the level of the comminuting unit relative to the liquid level of the sewage stream comprises a valve 43 operable by a float 44, a hose 45 leading from one side of valve 43 to an oil reservoir 46, a hose 47 extending from the reservoir to a pump 48, a hose 49 leading from the pump to a flow resistor 50, and a hose 51 leading from the resistor to branch hose 52 and 53. Hose 53 is connected to the lower end of cylinder 22 and hose 52 to a housing 54 enclosing valve 43. Housing 54 is supported on a bracket 55 secured to a collar 56 encircling sleeve 36. An apron 57 depending from the edge of bracket 55 is positioned upstream of float 44 to protect it from debris.

Float 44 is secured to one end of a lever 58 which is secured at its other end to a shaft 59 extending into housing 54. A shorter lever 60 secured to shaft 59 within housing 54 is secured at its other end to the stem 61 of valve 43. The float is so adjusted that when cutting cylinder 26 is submerged to the desired depth levers 58 and 60 are parallel to the top surface of the sewage. In this position valve 43 is partially open, and a predetermined portion of the oil from hose 51 passes through valve 43 and into reservoir 46. The opening between valve 43 and its seat 62 is limited so that the oil in hose 53 and the lower portion of cylinder 22 exerts sufficient pressure against piston 23 to hold the comminuting unit at the desired level.

The flow resistor 50, shown in Fig. 10, comprises an outer tube 63 connected at its upper end to hose 49 and at its lower end to hose 51. Both ends are apertured to permit oil from hose 49 to flow into hose 51. A plurality of closely fitted rubber washers 64 positioned in tube 63 are spaced by ring spacers 65 and are held in close contact with the spacers by a spring 66. Each washer is provided with a centrally disposed aperture 67 to permit the oil to flow through the resistor. The resistor could have a single washer with a very small aperture, but such an aperture might easily be clogged with particles of scale or other foreign material. The use of a plurality of washers permits the use of apertures large enough to prevent such clogging and still restrict the flow of oil to the desired extent.

If the liquid level of the sewage stream drops, float 44 moves downwardly to the same extent, thereby increasing the opening of valve 43 so that oil may pass through the valve faster than it flows through the resistor. This condition decreases the pressure in hose 52 relative to the pressure in hose 53, and the weight of the comminuting unit pulls piston rod 24 downwardly and forces oil from the lower end of cylinder 22 back through hose 53 and 52. Housing 54 moves downwardly with the comminuting unit and the inner frame 13. Shaft 59 moves downwardly with housing 54, and when the comminuting unit has moved downwardly enough to position the cutting cylinder in its slightly submerged position, levers 58 and 60 will again be parallel to the top surface of the sewage, and the valve will again be set at its partially open position in which the quantity of oil flowing through valve 43 is substantially the same as that flowing through resistor. Under these conditions the pressure in hose 53 remains constant and is sufficient to hold the comminuting unit in its adjusted position.

If the liquid level of the sewage rises, float 44 moves upwardly, thereby restricting the opening of valve 43, or closing it completely. The oil pressure in hose 53 and in the bottom of cylinder 22 is increased because the amount of oil that can flow through hose 52 is decreased, and piston rod 24 is moved upwardly, carrying inner frame 13 and the comminuting unit upwardly with it. Shaft 59 is moved upwardly with housing 54 until the levers 58 and 60 are again parallel to the upper surface of the sewage stream, and the cutting cylinder is again submerged slightly under the liquid level of the sewage.

Float 44 is very sensitive to changes in the liquid level, and since the liquid level fluctuations are not rapid small changes in the liquid level are sufficient to cause automatic adjustments in the positioning of the comminuting unit.

The solids in the sewage stream that are too large to pass through the screen are intercepted by the screen and held against it by the onflowing sewage. The solids that are intercepted by the screen in the area reached by the tines 37, or directly by the cutting cylinder 26, are carried to the comb 29 and comminuted. A rake 68 is provided to carry solids from the portions of the surface of the screen that are not reached by tines 37 up to the portion of the screen that is reached by the tines. The entire surface of the screen is periodically cleaned by vertical reciprocation of rake 68, and the solids cannot clog any portion of the screen to prevent the flow of liquid sewage therethrough.

Rake 68 comprises a transverse angle iron 69 adjacent opposite ends of which horizontal cylinders 70 and 70' are secured. A piston 71 mounted in each cylinder 70, 70' is provided with a piston rod 72 projecting through one end of the cylinder and engaging one end of a transverse bar 73. A collar 72' secured to each piston rod 72 is rigidly secured to bar 73 to insure movement of bar 73 in each direction when piston rods 72 are reciprocated. A plurality of rake fingers 74, each of which is secured at one end to bar 73, project through apertures in angle iron 69. The rake fingers are spaced so that each one projects into the space between adjacent screen ribbons 10 and projects beyond the forward edge of the screen ribbons when the rake fingers are in their outermost position, as controlled by piston rods 72, in a manner hereinafter described. The rake fingers are short enough so that in retracted position they do not extend beyond the forward edges of the screen ribbons.

Each horizontal cylinder 70, 70' is secured to the lower end of a support cylinder 75 by a bracket 76. Each support cylinder 75 is slidably mounted on a piston 77 to which one end of a piston rod 78 is secured. The opposite end of each piston rod is secured to a bracket 79 and rigidly mounted on top transverse member 14 of inner frame 13. Since the comminuting unit 24 is fixed to the lower transverse inner frame member 17, and bracket 79 is fixed to top transverse member 14, the vertical distance between the cutting cylinder 26 and bracket 79 remains constant, regardless of the specific position of the cutting cylinder. The bracket 79 acts as a stop member to limit the upward movement of cylinder 75, thereby insuring that the fingers 74 always stop in a predetermined position relative to tines 37 so that the tines, upon passing upwardly through the spaces between adjacent screen ribbons, lift the solids that have been moved upwardly along the surface of the screen by the rake, and transfer them to the cutting cylinder. The cutting cylinder carries the solids up to comb 27, where they are comminuted by the interengagement of teeth 31 and notches 32.

Referring to Figs. 2 and 13, particularly, the hydraulic circuit for reciprocating the rake vertically comprises a pump 80 connected by a hose 81 to a reservoir 82. A hose 83 extends from the discharge end of pump 80 to one port 84 of a four way valve 85. In the position of Fig. 13, port 84 is connected with another port 86, and a hose 87 is connected to a hose 88 leading to the upper ends of both support cylinders 75. A hose 89 branching off hose 88 leads to the back end of the horizontal cylinder 70. The front end of cylinder 70 is connected to the back end of cylinder 70' by a hose 90. Accordingly, when oil is pumped through hose 87 into the upper ends of support cylinders 75 these cylinders move upwardly to carry the rake upwardly, and both piston rods 72 are moved forwardly to project rake teeth 74, the piston 71 in cylinder 70' being moved forwardly by the oil displaced from the front end of cylinder 70 when its piston is moved forwardly by oil from hose 89. Both pistons 71 move simultaneously so that the ends of the rake remain parallel.

As oil from hose 88 forces cylinders 75 upwardly, the oil displaced from the lower portion of each cylinder 75 is forced through hose 92', past a spring loaded valve 91, through hose 92 into port 93 of valve 85. Port 93 communicates with port 94 which is aligned with a hose 95 leading to reservoir 82. At the same time oil displaced from the front end of horizontal cylinder 70' is forced through a hose 96 into hose 92. The pressure of oil being forced upwardly through hose 92' and 96 prevents any of the oil from hose 96 passing downwardly into hose 92'.

When cylinders 75 reach the upper end of their stroke the top of each abuts bracket 79 and no further upward movement is possible. Continued pumping action of pump 80 builds up pressure in a hose 97, and this pressure reverses a pressure operated switch 98. As shown in Fig. 13, pressure operated switch 98 is connected electrically, by a line 99, to a solenoid 100. The core 101 of solenoid 100 is connected at its outer end to a lever 102 operable to rotate valve 85, as shown in Figs. 11 and 13. Core 101 moves lever 102 to rotate valve 85 clockwise, as seen in Fig. 13, to align ports 84, 86, 93, and 94 with hose 87, 95, 83, and 92, respectively. The rotation of valve 85 reverses the flow of oil, and oil from pump 80 is forced through hose 92. The oil from hose 92 cannot pass through spring loaded valve 91, but passes through hose 96 and through a check valve 103 into hose 92'. The oil flowing through hose 96 is forced into the front end of cylinder 70' to retract rake 68. The oil displaced from the back end of cylinder 70' is forced into the front end of cylinder 70 to move both ends of the rake simultaneously. At the same time oil flowing through hose 92' is forced into the bottom end of cylinders 75 to move these cylinders downwardly. Rake 68 moves downwardly with cylinders 75, to which its opposite ends are secured by brackets 76, until the rake engages the bottom of the channel. During this downward movement of the rake, which is in its retracted position, oil displaced from the upper end of cylinders 75 and the back end of horizontal cylinder 70 is forced through hose 88 and 89 into hose 87. This oil passes through ports 84 and 86 of valve 85 into hose 95 and then into reservoir 82.

When cylinders 75 reach the lower end of their stroke and no further downward movement of rake 68 is possible, the continued pumping action of pump 80 builds up the pressure in hose 104 until it reverses another pressure operated switch 105. Pressure operated switch 105 is connected electrically, by a line 106, to a solenoid 107 having its core 108 connected to the opposite end of lever 102. Switches 98 and 105 are connected to a single power line 109 in such manner that only one solenoid can be energized at a time. When solenoid 107 is energized by switch 105 the lever 102 rotates valve 85 counterclockwise to restore the alignment of the ports with the hose as shown in Fig. 13. Each rotation of valve 85 reverses the flow of oil through the hydraulic circuit.

From the foregoing description of the hydraulic circuit it will be seen that a certain amount of oil is trapped between the front end of cylinder 70 and the back end of cylinder 70'. This trapped oil moves back and forth between cylinders 70 and 70' with each reversal of the hydraulic circuit to insure simultaneous and equal horizontal movement of both ends of rake 68. Rake 68 is projected to move fingers 74 beyond the front edge of screen 8 when the rake is moving upwardly, so that the rake fingers will carry the solids intercepted by the screen up to the tines of the cutting cylinder. During the downward movement of the rake, the fingers 74 are retracted so that they will not disturb the solids intercepted by the screen.

If the hydraulic circuit were perfectly tight, so that no oil leaks were possible, the movement described above could be continued indefinitely without cocking of the rake. However, some leakage is likely, and I have provided leveling means for injecting additional oil between the pistons of cylinders 70 and 70', whenever the leakage becomes great enough to alter the volume of oil trapped between the horizontal cylinders.

The leveling means, shown in Figs. 7 to 9, comprises a valve 110 positioned in piston 71. The leveling valve includes a tube 111 extending through an aperture provided therefor in piston 71 and having two loosely fitting pistons 112 and 113 separated from each other by a fixed distance and joined by a connecting piston rod 114. The pistons are shaped to fit seats 115 and 116, but rod 114 is longer than the distance between the valve seats so that when one piston is seated the other is disengaged from its seat. Two small apertures 117 and 118 extend through tube 111 outwardly of the valve seats 115 and 116, respectively.

As piston 71 is moving the rake outwardly the pistons 112 and 113 are in the position shown in Fig. 7. Piston 113 is seated so that oil cannot flow through tube 111 from the side of piston 71 that is under pressure. As piston 71 nears the end of its stroke, piston 112 strikes against the head 119 of cylinder 70, disengaging piston 113 from its seat 116 just before a nut 120 on piston rod 72 strikes cylinder head 119 and halts the movement of piston 71. As shown in Fig. 8, piston 112 does not move far enough towards its seat 115 to close aperture 117 and, therefore, oil may flow from the pressure side of piston 71 through aperture 118, tube 111, and aperture 117. This flow takes place if the piston of cylinder 70' has not reached the end of its stroke and some of the oil has leaked from the space between the front end of cylinder 70 and the back end of cylinder 70'. This flow continues until the piston in cylinder 70' reaches the end of its forward stroke and engages its cylinder head. At such time the volume of the oil trapped between the front end of cylinder 70 and the back end of cylinder 70' would be restored to normal.

If the leakage is in the opposite direction, that is, into the space between the front end of cylinder 70 and the back end of cylinder 70', so that too much oil is in this space, the volume of the trapped oil is restored to normal on the return stroke.

When the hydraulic flow is reversed and pistons 71 start moving towards the back of their cylinders to retract the rake, the pressure of oil flowing from hose 90 into the front end of cylinder 70 seats piston 112 thereby closing aperture 117. As the piston 71 approaches the end of its rearward stroke, piston 113 strikes cylinder head 121 at the opposite end of cylinder 70 to unseat piston 112 just as piston 113 was previously unseated. If the volume of trapped oil is too great, the excess will flow from the front end of cylinder 70 through aperture 117, tube 111, and aperture 118 into the back end of cylinder 70 until both pistons 71 reach the end of their forward stroke.

In Figs. 14 and 15 I have shown an embodiment of the invention in which the comminuting unit 25′ differs from the comminuting unit shown in Figs. 1 to 13 only in that the tines 37 are omitted from the cutting cylinder 26′. The structure is otherwise identical and is designated by the same reference numerals. The stroke of cylinders 75 is changed from that of the first embodiment to cause the upward movement of rake 68 to bring rake fingers 74 into close proximity to the cutting cylinder, so that the solid matter intercepted by the screen can be reached by the cutting cylinder.

In cases where screen 8 is inclined angularly of the sewage channel, instead of being disposed vertically, the rake may also be omitted. In such structure the current of the flowing stream of sewage would move the intercepted solid matter along the surface of the screen until it reaches the cutting cylinder or the tines which would lift the solid matter from the screen and transfer it to the cutting cylinder.

While I have described a few preferred embodiments of my invention in detail, it will be understood that the description thereof is illustrative rather than restrictive, as many details may be modified or changed without departing from the spirit or scope of my invention. Accordingly, I do not desire to be restricted to the exact construction described.

I claim:

1. In combination with a comminuting unit adapted for use in a sewage stream having a fluctuating liquid level, a hydraulic system for maintaining said unit in predetermined position relative to said liquid level, a float movable vertically in response to fluctuations in said liquid level, and means operatively connected to said float for automatically controlling the flow of fluid in said hydraulic system to move said unit vertically a distance equal to each fluctuation in said liquid level.

2. In combination with a comminuting unit adapted for use in a sewage stream having a fluctuating liquid level, a hydraulic system for maintaining said unit in predetermined position relative to said liquid level, said hydraulic system including a valve, and float means automatically controlling said valve for regulating the flow of fluid in said hydraulic system to move said unit vertically in response to fluctuations in said liquid level.

3. In combination with a comminuting unit adapted for use in a sewage stream having a fluctuating liquid level, float controlled hydraulic means for moving said unit vertically in response to fluctuations in the liquid level of a sewage stream in which it is positioned to keep said unit slightly submerged in said stream.

4. In combination, a screen adapted to be interposed in a flowing stream of sewage having a fluctuating liquid level for intercepting solids in said sewage, a comminuting unit positioned in said stream in proximity to said screen, and means for moving said comminuting unit vertically in response to fluctuations of said liquid level to maintain said comminuting unit in predetermined relationship to the liquid level of said stream.

5. In combination, a screen comprising a plurality of longitudinally extending spaced parallel screen elements adapted to be interposed in a flowing stream of sewage having a fluctuating liquid level for intercepting solids in said sewage, a comminuting unit comprising a rotatable cylinder positioned in proximity to said screen and a comb adapted to cooperate with said cylinder to comminute solids intercepted by said screen, and float control means for adjusting the position of said rotatable cylinder relative to the liquid level of said sewage stream.

6. In combination, a fixed support member, a cylinder rigidly secured to said support member, a piston slidably mounted in said cylinder, a piston rod connected to said piston and projecting from one end of said cylinder, a transverse member secured to said piston rod, a comminuting unit secured to said transverse member, and hydraulic means for moving said transverse member vertically relative to said fixed support member to adjust the vertical position of said comminuting unit.

7. In combination, a fixed support member, a cylinder rigidly secured to said support member, a piston slidably mounted in said cylinder, a piston rod connected to said piston and projecting from one end of said cylinder, a transverse member secured to said piston rod, a comminuting unit secured to said transverse member, hydraulic means for moving said transverse member vertically relative to said fixed support member to adjust the vertical position of said comminuting unit, and means for maintaining constant hydraulic pressure on said piston.

8. A level control device for a comminuting unit adapted to be positioned in a flowing stream of sewage having a fluctuating liquid level, said device comprising a hydraulic system, a valve for regulating the flow of fluid in said system, a float responsive to fluctuations in the liquid level of said stream of sewage for controlling said valve, a cylinder having a piston reciprocable therein in response to changes in fluid pressure in said system, and a piston rod connected to said piston and projecting from one end of said cylinder, said piston rod supporting said comminuting unit.

9. In combination with a sewage channel, a frame extending upwardly from the bottom of said channel, a screen mounted in said frame to intercept solids in sewage flowing in said channel, an inner frame mounted for slidable movement on said first frame, a comminuting device fixed to said inner frame, said comminuting device comprising a rotatable cutting cylinder and a comb, said cutting cylinder having teeth adapted to remove solids intercepted by said screen from said screen, said comb being adapted to cooperate with said cutting cylinder to comminute the solids removed from said screen, and means operable by the rise and fall of the liquid level of sewage flowing in said channel to automatically slide said inner frame relative to said first frame to maintain said comminuting device in predetermined relationship to the liquid level of said sewage.

10. In combination with a sewage channel, a rectangular frame extending upwardly from the bottom of said channel, a screen mounted in said frame, an inner frame slidably mounted in said first frame, a comminuting unit mounted on said inner frame in proximity to said screen, and means operable automatically by changes in the liquid level of sewage flowing in said channel to move said inner frame and comminuting unit relative to said first frame and screen.

11. In combination with a sewage channel, a rectangular frame extending upwardly from the bottom of said channel, a screen mounted in said frame, an inner frame slidably mounted in said first frame, a comminuting unit mounted on said inner frame in proximity to said screen, and hydraulic means for moving said inner frame and comminuting means relative to said first frame and screen, said hydraulic means including a float controlled valve for regulating the flow of fluid therein in response to fluctuations in the liquid level of sewage flowing in said channel.

12. In combination, a screen adapted to be interposed in a flowing stream of sewage for intercepting solids in said sewage, a frame extending above said screen, an inner frame slidably mounted in said first frame, a comminuting unit mounted on said inner frame in proximity to said screen and adapted to be submerged slightly below the liquid level of said stream of sewage, and means for holding said comminuting unit in predetermined position, said means being operable in response to fluctuations in the liquid level of said sewage to slide said inner frame relative to said first frame to maintain the predetermined relationship between said comminuting unit and the liquid level of said sewage as the liquid level rises and falls.

13. In combination, a screen adapted to be interposed in a flowing stream of sewage for intercepting solids in said sewage, a frame extending above said screen, an inner frame slidably mounted in said first frame, a comminuting unit mounted on said inner frame in proximity to said screen, means operable by changes in the liquid level of said sewage for sliding said inner frame relative to said first frame to maintain a predetermined relationship between said comminuting unit and the liquid level of said sewage, a rake for moving solids along said screen towards said comminuting unit, and stop means on said inner frame for limiting the movement of said rake towards said comminuting unit to maintain a predetermined spaced relationship between the uppermost position of said rake and said comminuting unit.

14. In combination, a screen comprising a plurality of longitudinally extending spaced parallel screen elements adapted to be interposed in a flowing stream of sewage for intercepting solids in said sewage, a frame extending above said screen, an inner frame slidably mounted in said first frame, a comminuting unit mounted on said inner frame in proximity to said screen, means operable by changes in the liquid level of said sewage for sliding said inner frame relative to said first frame to maintain a predetermined relationship between said comminuting unit and the liquid level of said sewage, a rake for moving solids along said screen towards said comminuting unit, said rake having fingers extending into the spaces between said screen elements, and hydraulic means for reciprocating said rake longitudinally of said screen and at right angles to said longitudinal movement to project said rake fingers beyond said screen elements during movement of said rake towards said comminuting unit and to retract said rake fingers during movement of said rake away from said comminuting unit.

15. In combination with a screen comprising a plurality of longitudinally extending spaced parallel screen elements adapted to be interposed in a flowing stream of sewage for intercepting solids in said sewage, a comminuting unit positioned in proximity to said screen, a rake having fingers extending into the spaces between said screen elements, and hydraulic means to reciprocate said rake longitudinally of said screen towards and away from said comminuting unit and to project and retract said rake fingers as said rake is being reciprocated respectively towards and away from said comminuting unit.

16. In combination with a screen comprising a plurality of longitudinally extending spaced parallel screen elements adapted to be interposed in a flowing stream of sewage for intercepting solids in said sewage, a comminuting unit positioned in proximity to said screen, a rake having fingers extending into the spaces between said screen elements, and hydraulic means to reciprocate said rake longitudinally of said screen towards and away from said comminuting unit to project and retract said rake fingers as said rake is being reciprocated respectively towards and away from said comminuting unit, said hydraulic means including a valve and pressure operated means to reverse said valve to change the direction of longitudinal movement of said rake at each limit of its travel.

17. In combination with a screen comprising a plurality of longitudinally extending spaced parallel screen elements adapted to be interposed in a flowing stream of sewage for intercepting solids in said sewage, a comminuting unit positioned in proximity to said screen, a rake having fingers extending into the spaces between said screen elements, and hydraulic means to reciprocate said rake longitudinally of said screen towards and away from said comminuting unit and to project and retract said rake fingers, said hydraulic means including a valve and pressure operated means to reverse said valve at each limit of travel of said rake to reverse the direction of longitudinal movement of said rake, to project said rake fingers beyond the surface of said screen at the limit of travel remote from said comminuting unit, and to retract said rake fingers at the limit of travel closest to said comminuting unit.

18. In combination with a screen comprising a plurality of longitudinally extending spaced parallel screen elements adapted to be interposed in a flowing stream of sewage for intercepting solids in said sewage, a comminuting unit positioned in proximity to said screen, a rake having fingers extending into the spaces between said screen elements, and hydraulic means to reciprocate said rake longitudinally of said screen towards and away from said comminuting unit and to project and retract said rake fingers as said rake is being reciprocated respectively towards and away from said comminuting unit, said hydraulic means including a pair of cylinders supporting opposite ends of said rake, corresponding ends of said cylinders being interconnected, and a pair of horizontally disposed cylinders adjacent opposite ends of said rake to control the reciprocation of said rake fingers, the front end of one of said horizontal cylinders communicating with the back end of the other to insure simultaneous and equal movement of all the rake fingers.

19. In combination with a screen comprising a plurality of longitudinally extending spaced parallel screen elements adapted to be interposed in a flowing stream of sewage for intercepting solids in said sewage, a comminuting unit positioned in proximity to said screen, a rake having fingers extending into the spaces between said screen elements, and hydraulic means to reciprocate said rake longitudinally of said screen towards and away from said comminuting unit and to project and retract said rake fingers as said rake is being reciprocated respectively towards and away from said comminuting unit, said hydraulic means including a pair of cylinders adjacent opposite ends of said rake, the front end of one cylinder communicating with the back end of the other, and leveling means in one of said cylinders to maintain the volume of fluid trapped between said front and back ends.

20. A comminuting unit adapted to be slightly submerged below the liquid level of a flowing stream of sewage containing solids to be comminuted and hydraulic means operable automatically in response to fluctuations in said liquid level to move said unit vertically in said sewage to maintain the unit in predetermined relationship to said liquid level, said hydraulic means including a pump, a valve, connecting hose, a support cylinder, a line connecting said support cylinder to said hose between said pump and said valve, and a float movable with the rise and fall of said liquid level, said float controlling said valve to regulate the fluid pressure in said line to thereby control vertical movement of said comminuting unit.

21. A comminuting unit adapted to be slightly submerged below the liquid level of a flowing stream of sewage containing solids to be comminuted and hydraulic means operable automatically in response to fluctuations in said liquid level to move said unit vertically in said sewage to maintain the unit in predetermined relationship to said liquid level, said hydraulic means including a pump, a valve, connecting hose, a support cylinder, a line connecting said support cylinder to said hose between said pump and said valve, and a float movable with the rise and fall of said liquid level, said float holding said valve in partially open position to maintain a constant, uniform pressure in said line when said comminuting unit is positioned in said predetermined relationship to said liquid level.

22. In combination with a screen comprising spaced parallel screen elements for intercepting solids in a flowing stream of sewage, a comminuting unit positioned in proximity to said screen, a rake having fingers extending into the spaces between said screen elements, and hydraulic means to simultaneously reciprocate said rake longitudinally of said screen and project or retract said rake fingers, said hydraulic means comprising a pair of cylinders each provided with a piston reciprocable therein, a hose connecting the front end of one cylinder with the back end of the other whereby fluid displaced from the front end of one cylinder by movement of its piston is forced into the back end of said second cylinder to insure simultaneous and equal movement of all the rake fingers when a predetermined quantity of fluid is trapped between said pistons, and a leveling device for constantly maintaining the quantity of fluid trapped between said two pistons, said leveling device comprising a tubular cylinder extending through an aperture in a piston reciprocable in one of said cylinders, said tubular cylinder having both ends open and oppositely facing valve seats adjacent opposite ends, a piston rod longer than the distance between said valve seats positioned in said tubular cylinder, a piston mounted on each end of said piston rod, a pair of apertures extending through the side wall of said tubular cylinder, each of said apertures being positioned on opposite sides of said first mentioned piston, the piston of said pair of pistons on the pressure side of said first mentioned piston being held against its seat to close the adjacent aperture by the pressure of the fluid moving said first mentioned piston, and means for displacing both of said pair of pistons from said apertures when the quantity of fluid trapped between said first mentioned pistons is changed by leakage to permit flow of fluid through said apertures to restore the predetermined quantity of oil between said first mentioned pistons.

23. The method of comminuting solids in a flowing stream having a fluctuating liquid level, which comprises submerging a comminuting unit slightly below the liquid level of said stream, moving said comminuting unit vertically in said stream in response to the fluctuations in said liquid level to maintain it in said predetermined slightly submerged position, and moving the solids in said stream to said unit for comminution.

24. The method of comminuting solids in a flowing stream having a fluctuating liquid level, which comprises submerging a comminuting unit slightly below the liquid level of said stream, moving said comminuting unit vertically in said stream in response to the fluctuations in said liquid level to maintain it in said predetermined slightly submerged position, positioning a screen adjacent said comminuting unit to intercept said solids, and periodically moving said solids intercepted by said screen to said comminuting unit for comminution.

References Cited in the file of this patent

UNITED STATES PATENTS

| | | |
|---|---|---|
| 1,944,351 | Landry | Jan. 23, 1934 |
| 2,301,122 | Kellett | Nov. 3, 1942 |
| 2,633,989 | Kelly et al. | Apr. 7, 1953 |
| 2,672,985 | Nordell | Mar. 23, 1954 |
| 2,708,036 | Lauwasser | May 10, 1955 |